United States Patent [19]

Ogawa

[11] Patent Number: 4,976,011
[45] Date of Patent: Dec. 11, 1990

[54] APPARATUS FOR COLLECTING ROE AND FISH BODY PROCESSING MACHINE USING THE SAME

[75] Inventor: Yutaka Ogawa, Ibaraki, Japan

[73] Assignee: Nippon Fillestar Co., Ltd., Osaka, Japan

[21] Appl. No.: 376,597

[22] Filed: Jul. 7, 1989

[30] Foreign Application Priority Data

May 12, 1989 [JP] Japan .................................. 1-120175

[51] Int. Cl.$^5$ .............................................. A22C 25/14
[52] U.S. Cl. .................................................. 452/110
[58] Field of Search ...................... 17/53, 55, 63, 58, 45

[56] References Cited

U.S. PATENT DOCUMENTS

| | | | |
|---|---|---|---|
| 3,793,676 | 2/1974 | Wiggins | 17/45 |
| 3,925,846 | 12/1975 | Leander | 17/58 |
| 4,332,057 | 6/1982 | Smith | 17/55 |
| 4,563,793 | 1/1986 | Ryan | 17/58 |
| 4,630,335 | 12/1986 | Claudon | 17/58 |

FOREIGN PATENT DOCUMENTS 3233746  9/1988  Japan ..................................... 17/58

*Primary Examiner*—Willis Little
*Attorney, Agent, or Firm*—Wenderoth, Lind & Ponack

[57] ABSTRACT

An apparatus for collecting roe comprises a conveyor for conveying a fish body such that a cut section of a decapitated fish body is downward. The tail of the decapitated fish body is held, and a roe collector is disposed at a position abutting against the tail side of the tail of the abdomen of the fish body along the conveying route of the decapitated fish body by the conveyor, and is thrust elastically in a direction approaching the conveying route in a manner free to dislocate in a direction crossing the conveying direction. The decapitated fish body is thereby conveyed with the cut section downward, having its tail pinched by the conveyor. Along this conveying route the roe collector is provided, and the caudal side of the abdomen of the fish body is elastically pressed. As a result, the fish eggs is elastically pressed. As a result the fish eggs are squeezed out of the cut section of the decapitated fish body.

6 Claims, 11 Drawing Sheets

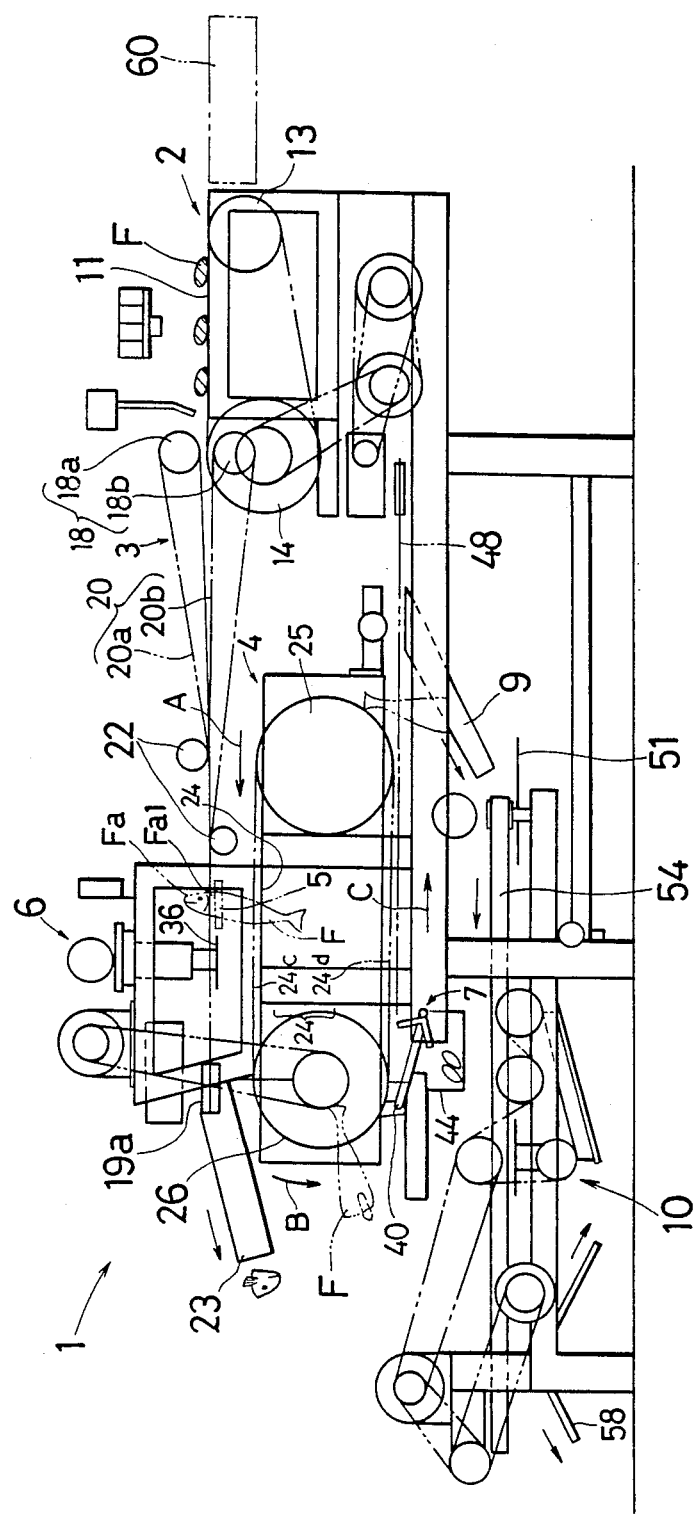

APPARATUS FOR COLLECTING ROE AND FISH BODY PROCESSING MACHINE USING THE SAME

BACKGROUND OF THE INVENTION

1. Field of Invention

The present invention relates to an improvement of an apparatus for collecting roe capable of continuously taking eggs without damaging, by chopping of the head, in order to collect roes of, for example, Alaska pollack, and a fish processing machine using the same.

2. Description of the Prior Art

An apparatus for collecting roe of fish in a typical prior art device is designed to convey the fish body by a conveyor belt, position the front end of the head of the fish body in the midst of conveyance with respect to a reference position in the longitudinal direction of the fish body, chop off the head of the fish body, and press the abdomen of the decapitated fish body by a pressing member to take out the ovaries.

According to the prior art as shown above, since the head size varies with the size of the fish body, and the chopping position varies, or when the fish body slips on the conveying belt when decapitating to be oblique to the conveying direction, the fish body is cut off obliquely and the ovaries may be damaged, or the ovaries cannot be taken out smoothly.

SUMMARY OF THE INVENTION

It is hence a primary object of the invention to solve the above problems, and to present an apparatus for collecting roe capable of taking out the ovaries smoothly and securely without damage, and also increase the processing speed.

To achieve the above object, the invention presents an apparatus for collecting roe comprising means for conveying such that a cut section of a decapitated fish body is downward, by holding the tail of the decapitated fish body. A means for collecting roe is disposed at a position abutting against the tail side of the tail of the abdomen of the fish body along the conveying route of the decapitated fish body by the conveying means, and is thrust elastically in a direction approaching the conveying route in a manner free to dislocate in a direction crossing with the conveying direction.

The invention also relates to an apparatus for collecting roe comprising a first conveying means for pinching the heads of fish bodies sequentially supplied in a position lying with their abdomens directed downstream with respect to the conveying direction, and conveying while pinching the fish body and sequentially changing position so that the heads may be directed upwards as the fish bodies are being conveyed. A second conveying means is disposed closely beneath the first conveying means, possessing an upper traveling route for running in the same direction and nearly at the same or faster speed in the conveying direction as the first conveying means and a lower traveling route disposed beneath the upper traveling route with a running direction reversed with respect to the upper traveling route. The second conveying means pinches the tail of the fish body with a head directed upward along the upper traveling route, and conveys a fish body with its tail directed upward along the lower traveling route.

means A for pressing the abdomen of a fish body is along disposed the conveying route by the first and second conveying means, and is elastically thrust upstream with respect to the conveying direction, having an abutting member of which the front end is disposed at a position opposite the head side of the abdomen of the fish body. A means for chopping the head is disposed along the conveying route by the first and second conveying means, and while the abdomen is pressed with the abdomen pressing means to shift the ovaries to the caudal side within the abdominal cavity, cuts off the fish body near the root of the pectoral fin. The means for collecting roe is disposed beneath the second conveying means, and by pushing the caudal side of the abdomen of the fish body with a roe collecting member having a part for storing the pectoral fin of the fish body, and pushes out the ovaries.

More specifically, the first conveying means of the apparatus for collecting roe of the invention comprises a pair of upper and lower start end pulleys having parallel axes lying approximately in the horizontal direction, a pair of right and left finish end pulleys having parallel axes lying approximately in the vertical direction, and a pair of belts respectively wound on these two pairs of pulleys, the belts being elastically thrust in a direction approaching to each other, with the head dislocated upward on the way of conveying by pinching the head of the fish body in lying position.

The second conveying means of the apparatus for collecting roe of the invention comprises a pair of endless chains wound on two pairs of sprocket wheels having horizontal axis. A means for pinching the tails of fish bodies are disposed on the endless chains at specific intervals in the longitudinal direction, possessing pinching members having projections formed on mutually confronting sides, and mounting members for elastically fixing the pinching members to the endless chains. A guide member guides the endless chains so as to move the pinching members in mutually approaching directions along with the progress of conveying. A positioning means for guiding abuts against the mounting means in order to define the vertical position of the pinching means.

The means for collecting roe of the apparatus for collecting roe of the invention comprises a pair of backing members disposed beneath the second conveying means at a shorter interval than the width of the fish body along the lateral direction in the fish body conveying route so as to confront from the right and left side. An L-shaped roe collecting member is disposed beneath the backing members in a direction crossing the fish body conveying route, being directed upstream with respect to the fish body conveying direction. The roe collecting member is mounted on a support shaft which shaft is elastically thrust approximately upward in the vertical direction, and possesses an elastic restoring power in the angular dislocation direction.

The invention furthermore relates to a fish body processing machine using an apparatus for collecting roe comprising a first conveying means for pinching the head of fish bodies sequentially supplied in a lying position with their abdomen directed downstream with respect to the conveying direction, and conveying while pinching the fish body in the pinching direction sequentially moving so that the fish heads may be directed upwards as the fish bodies are being conveyed. A second conveying means is disposed closely beneath the first conveying means, possessing an upper traveling route for running in the same direction and at the same speed as the first conveying means, and a lower traveling route disposed beneath the upper traveling route with the running direction inverted with respect to the upper traveling route, for pinching the tail of the fish body with the head directed upward along the upper traveling route, and conveying the fish body with the tail directed upward along the lower traveling route,.

A means for pressing the abdomen is disposed along the conveying route by the first and second conveying means, elastically thrust upstream with respect to the conveying direction, housing an abutting member of which the front end is disposed at a position opposite the head end of the abdomen of the fish body. A means for chopping the head is disposed along the conveying route by the first and second conveying means, which while the abdomen is pressed with the abdomen pressing means to shift the ovaries to the caudal side within the abdominal cavity, cuts off the fish body near the root of the pectoral fin. A means for collecting roe is disposed beneath the second conveying means. The caudal side of the abdomen of the fish body is pushed with a roe collecting member having a part for storing the pectoral fin of the fish body, and pushing out the ovaries. A fish body processing device receives the fish body after discharging the ovaries, and processes the fish body.

According to the invention, the decapitated fish body is conveyed with its cut section downward, having the tail pinched by the conveying means. Along this conveying route is provided the roe collecting means, and the caudal side of the abdomen of the fish body is elastically pressed. As a result, the fish eggs are squeezed out of the cut section of the decapitated fish body.

Also according to the invention, the fish body is presented to the first conveying means with the abdomen lying down on the downstream side, in the conveying direction. With the first conveying means, the heads of the fish bodies are pinched, and the pinching direction is sequentially changed so that the heads may be directed upward as the conveying progresses. Closely beneath the first, conveying means is disposed, second conveying means along its upper traveling route the tail of the fish body having the head directed upward by the first conveying means is pinched. When the fish body having the tail pinched reaches the lower traveling route of the second conveying means, the fish body is inverted so that the head may be directed downward.

The fish body along the conveying route of the first and second conveying means is elastically pressed at the position of the head side of the abdomen of the fish body, being directed to the upstream side of the conveying direction by the abdomen pressing means, so that the ovaries in the fish body are shifted to the caudal side within the abdominal cavity. In this state, the fish body is cut off near the pectoral fin root by the chopping means, and the head is chopped off. Beneath the second conveying means is the roe collecting means having a storing par for storing the pectoral fins of the fish body, and the caudal side of the abdomen of the fish body is pressed, and the ovaries are pushed out.

Furthermore, according to the invention, the first conveying means comprises a pair of start end pulleys having parallel axes lying approximately in the horizontal direction, a pair of finish end pulleys having parallel axes lying approximately in the vertical direction, and a pair of belts respectively wound on these two pairs of pulleys. Therefore, the fish body is conveyed while being pinched by the belts from the start end pulleys to the finish end pulleys, being smoothly changed from the approximately horizontal position to the approximately vertical position.

Moreover, according to the invention, the second. conveying means has pinching members having projections formed, on the mutually confronting faces of the pinching members for pinching the tail of the fish body. Accordingly, the fish body is securely held by the pinching members. This pinching action is effected as the pinching members are moved in a mutually approaching direction by the guide member with the progress of conveyance.

According to the invention, in addition, the fish body is inverted so that the head may be directed downward along the lower traveling route of the second conveying means, and is elastically pressed in the abdomen toward the upstream side of the conveying direction of the fish member by the L-shaped roe collecting member. At this time, since the roe collecting member has a storing part for storing the pectoral fins of the fish body, disturbance of the pressing of the abdomen of the fish body by pectoral fins is prevented. Besides, when pressing the abdomen of the fish body with the roe collecting member, the dorsal side of the fish body is supported by the backing members disposed at a shorter interval than the length of the fish body in the lateral direction. Therefore, bending of the fish body when pressing is prevented, and the eggs in the abdominal cavity can be securely collected.

Furthermore, according to the invention, after collecting the roe with the apparatus for collecting roe possessing such functions, the decapitated fish bodies are processed as desired by the fish body processing machine. Hence, both the eggs and the body of the captured fish can be effectively utilized.

In the invention, as is clear from the description herein, the decapitated fish body is conveyed by the conveying means with the cut section downward, and the caudal side of the abdomen is pressed by the roe collecting means. As a result, the eggs can be smoothly and securely squeezed out of the fish body. Besides, the fish body is conveyed an positioned a the lying position with the abdomen directed downstream, and the head is pinched upward by the first conveying means and the second conveying means, and the head is chopped off, while the ovaries are collected by the roe collecting means at the downstream side, and the remaining fish body is sent into a filleting machine. Therefore, according to the invention, the eggs can be smoothly and securely collected without damaging the ovaries regardless of the size of the fish body, and the processing speed is increased. The fish, body after discharging the eggs, can be automatically processed into products by the filleting machine.

Since the first conveying means receives the fish body in a lying position and grips its head, and changes the direction so that the head may be upward while conveying, it is helpful for moving the ovaries to the caudal side of the fish body, together with the abdomen pressing means in the subsequent head chopping process, so that damage to the ovaries may be prevented.

The second conveying means has a pair of endless chains applied on two pairs of sprocket wheels, and the pinching members having projections or roughness formed on the confronting faces are guided to these chains by the guide member and holding member, so that the fish body can be securely conveyed by pinching the tail.

The roe collecting means possesses a pair of confronting backing plates, and a roe collecting plate opposite the conveying route of the fish body beneath the backing plates, and since this roe collecting plate can be elastically pushed down and oscillated, the ovaries can be securely taken out of the fish body without being damaged.

BRIEF DESCRIPTION OF THE DRAWINGS

The above and other objects of the invention, as well as the features and advantages thereof, will be better understood and appreciated from the following detailed description taken in conjunction with the drawings, in which.

DETAILED DESCRIPTION OF THE PREFERRED EMBODIMENTS

Figure 2:
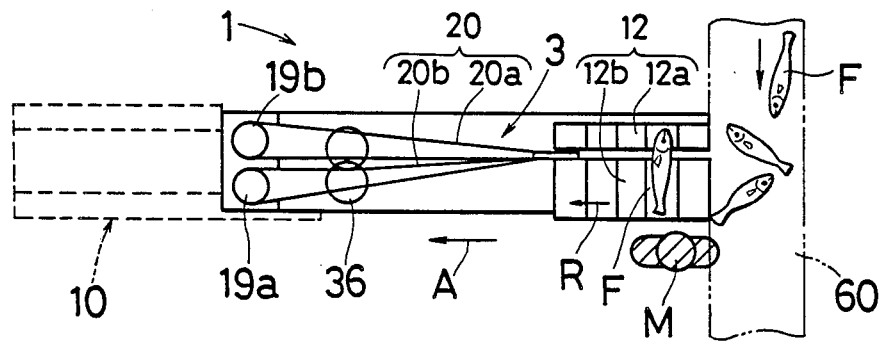
FIG. 2 is a plan view of essential parts of the embodiment of FIG. 1.

Referring now to the drawings, some of the preferred embodiments of the invention are described in details below.

Figures 1, 17:
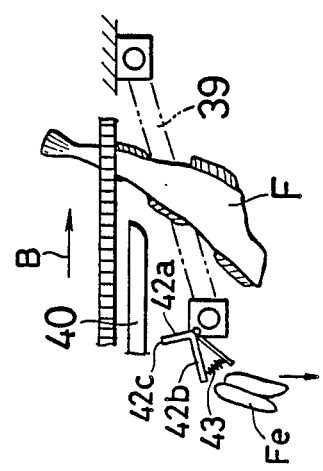
FIG. 1 is a side view showing a embodiment of the invention.
FIG. 17 (1-3) is a side view of operating states of a roe collecting means.
Figures 2, 17:
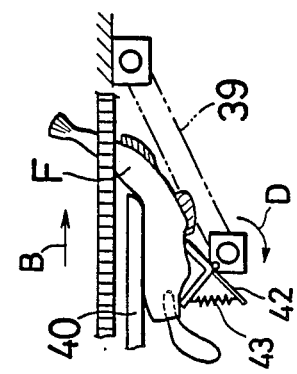
Figures 3, 17:
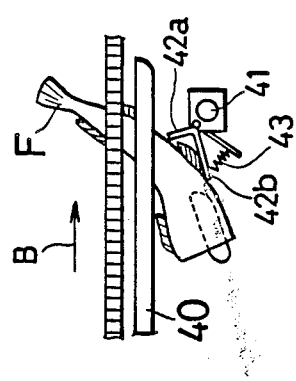

FIG. 1 is a side view of a embodiment of the invention, and FIG. 2 is a plan view of its essential parts. The apparatus for collecting roe 1 of the invention is composed of positioning means 2, first conveying means 3, second conveying means 4, abdomen pressing means 5, chopping means 6, roe collecting means 7, and third conveying means 8, and it is connected to a filleting machine 10, which is a fish processing machine.

Figure 3:
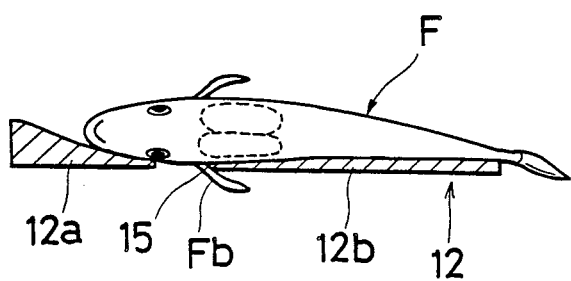
FIG. 3 is a sectional view showing a positioning action.

The positioning means 2 is a charge conveyor 11, and this charge conveyor 11 has plural plates 12 for mounting fish bodies F disposed continuously in parallel with the longitudinal direction at right angles to the conveyor forwarding direction R, and is threaded around start end side pulley 13 and finish end side pulley 14. The structures of these plates 12 has width enough to mount the fish body F in a lying position, is a square on the whole, has a concave groove running along in the longitudinal direction formed on the surface, and is divided, as shown in FIG. 3, into a first segment 12a for mounting the head part, and a second segment 12b for mounting the belly part, and there is a gap 12c of about 10 mm between them, and both the segments 12a and 12b are integrally coupled. An end face 15 of the second segment 12b facing the first segment 12a side is thinly formed so as to be easily inserted in the space between the fish body F and its pectoral fin Fb.

The first conveying means 3 is coupled to the lower side of the conveying direction of the positioning means 2, and it receives the fish body F from the positioning means 2, and the vicinity of the head Fa is pinched from both sides, and it is designed to convey in the direction of arrow A while rotating 90 degree so that the head Fa may be directed upward. Accordingly, the first conveying means 3 possesses a pair of upper and lower start end V-pulleys 18a and 18b having parallel horizontal axial lines, a pair of right and left finish end V-pulleys 19a and 19b having parallel vertical axial lines, and a pair of V-belts 20a and 20b elastically thrust in mutually approaching directions, oppositely wound on these two pairs of pulleys 18a and 18b; 19a and 19b.

Figure 4:
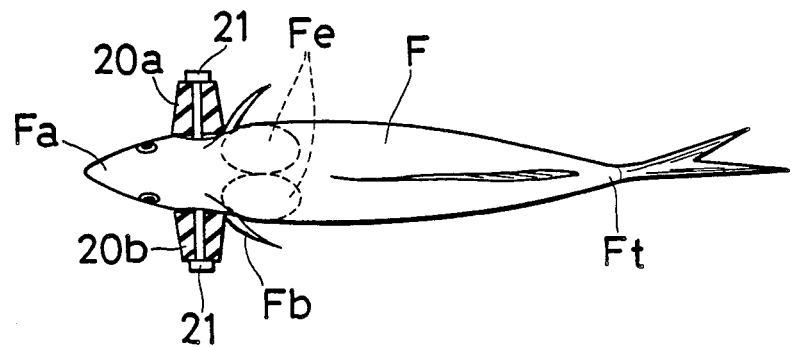
FIG. 4 is an enlarged sectional view of essential parts of a first conveying means.

On the confronting surfaces of the V-belts 20a and 20b, as shown in FIG. 4, multiple stopping needle members 21 for preventing escape of the fish body F have their ends projected along the thicknesswise direction. The V-belts 20 are, in order to rotate 90 degrees, guided by plural V-shaped guide rollers 22 each having the direction of their axial line displaced by a specific angle. At the terminal end of the first conveying means 3, there is a fish head discharge chute 23.

Figure 5:
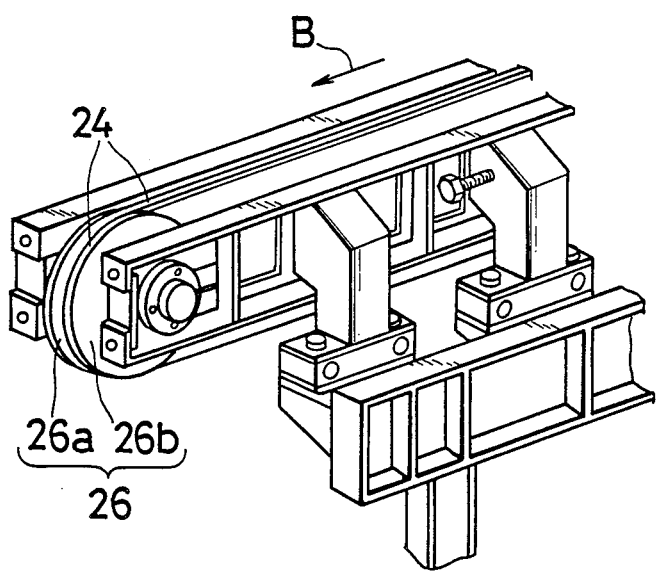
FIG. 5 is a perspective view of essential parts of a second conveying means.

The second conveying means 4 is disposed beneath and from the middle of the first conveying means 3 to a position beyond the finish end pulleys 19a and 19b, and it is formed so as to convey a fish by pinching the tail Ft of the fish body F angularly disposed with the head Fa upward vertically by the first conveying means 3. Accordingly, the second conveying means 4, as shown in the perspective view in FIG. 5, has a pair of endless chains 24a and 24b wound and applied on two pairs of the start end side and finish end side sprocket wheels 25 and 26 having horizontal axial lines.

Figure 6:
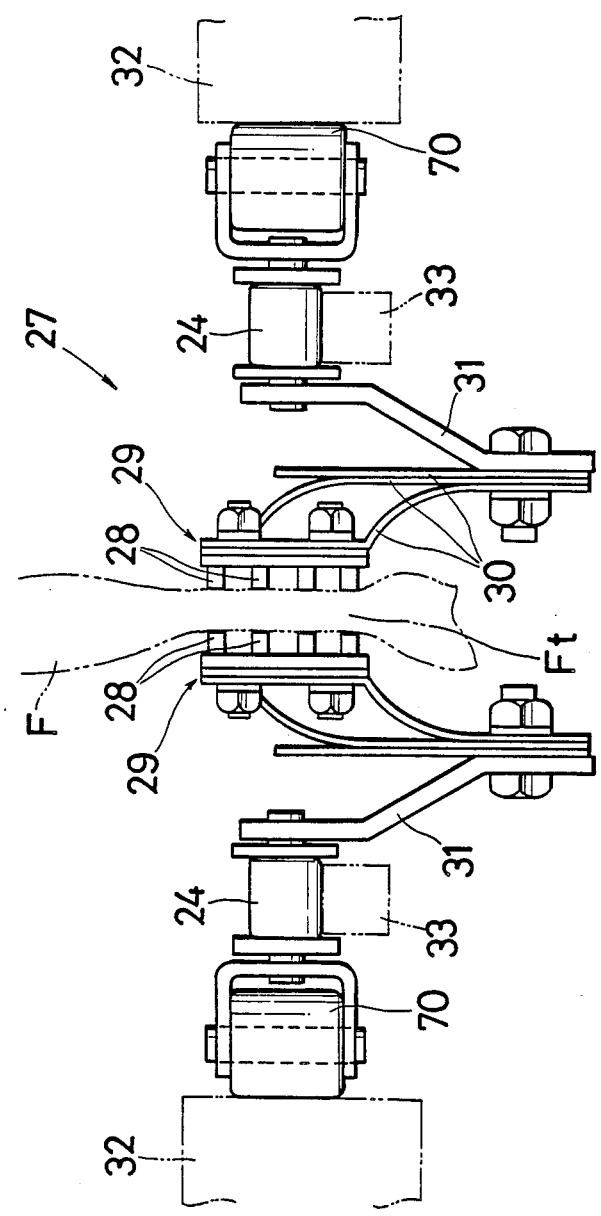
FIG. 6 is an enlarged front view of essential parts of the second conveying means.

These chains 24 are provided with plural pinching means 27 at a clearance in the longitudinal direction. The pinching means 27 possesses, as shown in the front view in FIG. 6 and plan view in FIG. 7, a pinching member 29 having mutually confronting faces undulated by plural stopping projections 28, and a mounting member 31 for fixing the pinching member 29 to the chain 24 by way of an elastic material 30 made of, for example, non-rusting metal plate having a spring action. On the mutually opposite sides of each chain 24, there are plural rollers 70 having the rotation axial lines nearly in the vertical direction (vertical direction in FIG. 6), which slide on a guide member 32. The pinching means 27 are dislocated in the directions to approach each other as the chains 24 are guided by the guide member 32 through the rollers 70, and the vertical position is determined by a positioning member 33 which guides by abutting against the chains 24.

The endless chains 24 in the second conveying means 4 are parallel to the V-belt 20 of the first conveying means 3, and run at the same speed. The pair of endless chains 24a and 24b have their opposing gap widened so as to release the pinched fish body F at the upstream side of the conveying direction near the start end sprocket 25 of the lower traveling route 24d.

Figure 8:
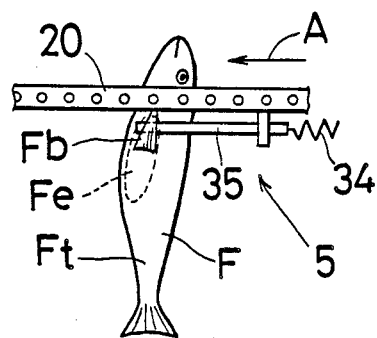
FIG. 8 is a side view of essential parts of the abdomen pressing means.
Figure 9:
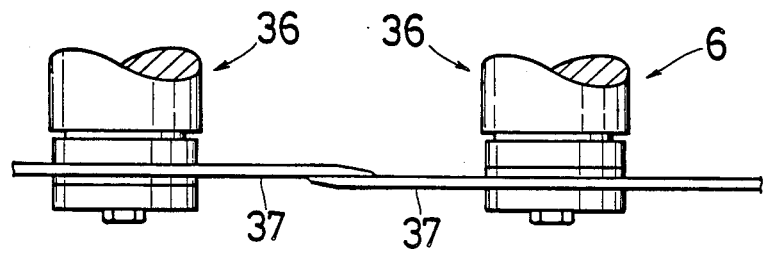
FIG. 9 is an enlarged front view of essential parts of the chopping means.

The abdomen pressing means 5 is installed on the way of the route of conveyance of the the fish body F as it is pinched by the first conveying means 3 and the second conveying means 4. The abdomen pressing means 5 is, as shown in FIG. 8, projected oppositely from both the right and left sides of the fish body orthogonally crossing the conveying route of the fish body F, and comprises a pair of abutting members 35 in a bar shape, being free to oscillate while being thrust upstream by a spring 34, designed to press down the abdomen of the fish body F being conveyed, and temporarily push down the ovaries Fe in the abdominal cavity toward the tail Ft.

As the chopping means 6, a pair of right and left cutters 36 having a pair of rotary blades 37 are installed so as to cut in the vicinity of the pectoral fin Fb of the fish body F while the abdomen is pressing.

The roe collecting means 7 is disposed beneath the second conveying means 4, and it rotates around the finish end sprocket 26 of the second conveying means 4 a half turn while the endless chain 24 is pinching the tail Ft of the fish body F, thereby reaching the lower traveling route 24d, and it is installed opposite the route of conveyance of the fish body F with the cut section downward.

Figure 10:
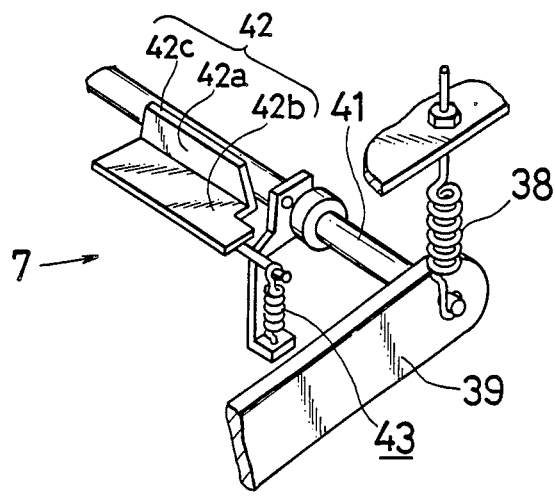
FIG. 10 is a perspective view of essential parts of the roe collecting means.
Figure 11:
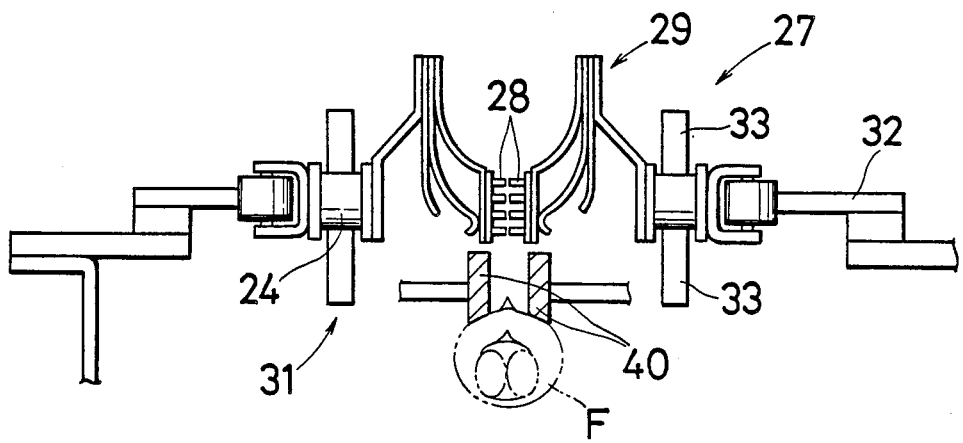
FIG. 11 is a front view of an operation mode.

This roe collecting means 7 as shown in a perspective view of essential parts in FIG. 10 and in a front view of essential parts in FIG. 11 is combined with a pair of backing plates 40 mutually opposing from the right and left, confronting the conveying route of the fish body F, closely beneath the lower traveling route 24d of the endless chain 24, and an L-shaped roe collecting plate 42 affixed to a horizontal support shaft 41, with the longitudinal direction orthogonally crossing the route of the fish body F beneath the backing plates 40.

The backing plates 40 are chamfered so as to contact widthly with the roundness of the back of the fish body F on the bottom surfaces, and the interval of the right and left plates 40 is adjusted to be wider than the width of the portion close to the tail of the dorsal part of the fish body, But narrower than the width of the belly part.

The roe collecting plate 42 is fixed to the support shaft 41 supported on the end part of the oscillatable arm 39, and is suspended by a spring 38 together with the support shaft 41, and is elastically thrust upward. The roe collecting plate 42, usually, has one L-shaped plate 42a directly obliquely upward at the upstream side of the conveying route, and the other end plate 42a is adjusted to be obliquely downward at the upstream side so as to be elastically thrust downward through a spring 43, being free to dislocate angularly about the corners.

Beneath the roe discharge means 7 there is a roe discharge chute 44.

Figure 12:
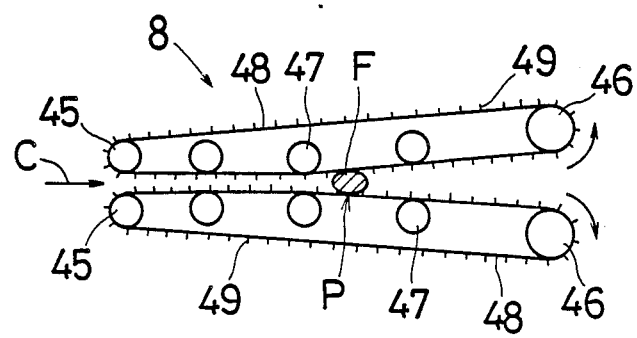
FIG. 12 is a plan view of a third conveying means.

Beneath the second conveying means 4 at the downstream side of the roe collecting means 7, there is a third conveying means 8. The third conveying means 8 possesses, as shown in the plan view in FIG. 12, a pair of right and left start end pulleys 45, 45, and finish end pulleys, 46, 46 having vertical axial lines so as to receive the fish body F after finishing the collection of roe immediately before the second conveying means 5 releases it, and a pair of belts 48, 48 which are wound and driven by these pulleys 45, 46, and guided by plural guide rollers 47. On the mutually confronting faces of the belts 48, similar to the V-belt 30 of the first conveying means 3, plural stopping needles 49 are projected along the longitudinal direction. The pair of belts 48, 48 have their confronting gap widened so as to release the fish body F near the finish end pulleys 46.

Beneath the position P (see FIG. 12) where the pair of belts 48, 48 release the fish body F, there is a fish body receiving chute 9, and a filleting machine 10 is connected at its downstream side.

Figure 13:
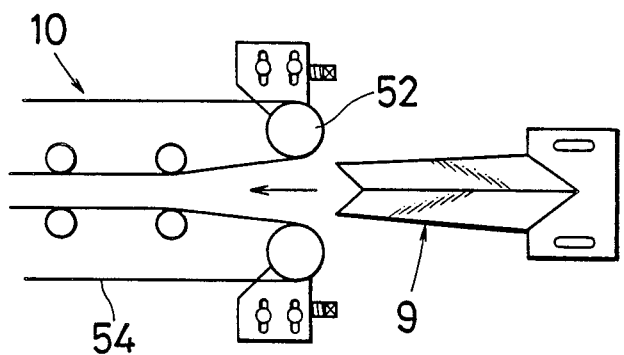
FIG. 13 is a plan view of a fish body receiving chute.

The fish body receiving chute 9 is shown in plan view in FIG. 13. The chute 9 is formed in a reverse V-shape so that the fish body F may have the cut section directed at the downstream side (the left side in FIG. 3), and may be correctly supplied into the filleting machine 10 with the dorsal side directed upward.

Figure 14:
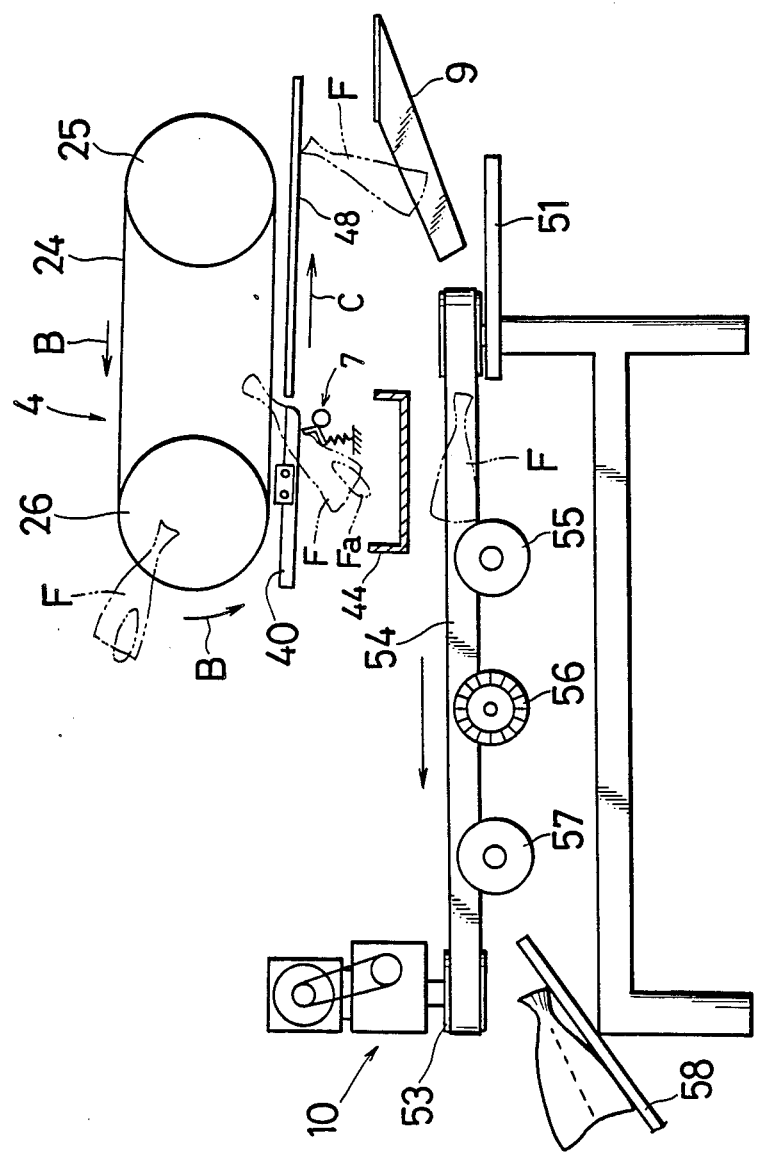
FIG. 14 is a side view of a filleting machine.

The filleting machine 10 is a device for processing, for example, the fish body F after collecting the roe in a flat open state, and is, as shown in FIG. 13 and the side view in FIG. 14, composed of a fish body receiving plate 51, a pair of right and left feed belts 54, 55 being driven as wound on start end pulley 52 and finish, end pulley 53, a belly cutter 55 disposed along the way of the fish body conveying route by the feed belts and possessing horizontal axial lines so as to open the abdomen of the fish body F which is rotated and driven along the longitudinal direction, a cutting roll 56 for removing the viscera, having multiple concave grooves formed on the surface along the axial line direction, and a fillet knife 57 for removing the stem bone, while a fillet chute 58 is disposed at the lowermost downstream end.

The mode of operation of the above structure is explained below.

As shown in FIG. 2, the fish bodies F randomly mounted and supplied on the feed conveyor 60 are picked up one by one by the operator M, and are put on the plate 12 of the feed conveyor 11 in the lying position, with the abdomen directed to the downstream side in the running direction, and the tail at the nearer side. When putting on the plate 12, the root of the pectoral fin Fb of the fish body F is hooked on a thin end face 15 facing the first segment 12a side of the second segment 12b of the plate 12. By this operation, the fish body F is correctly positioned in the decapitating position with respect to the longitudinal direction.

Figure 15:
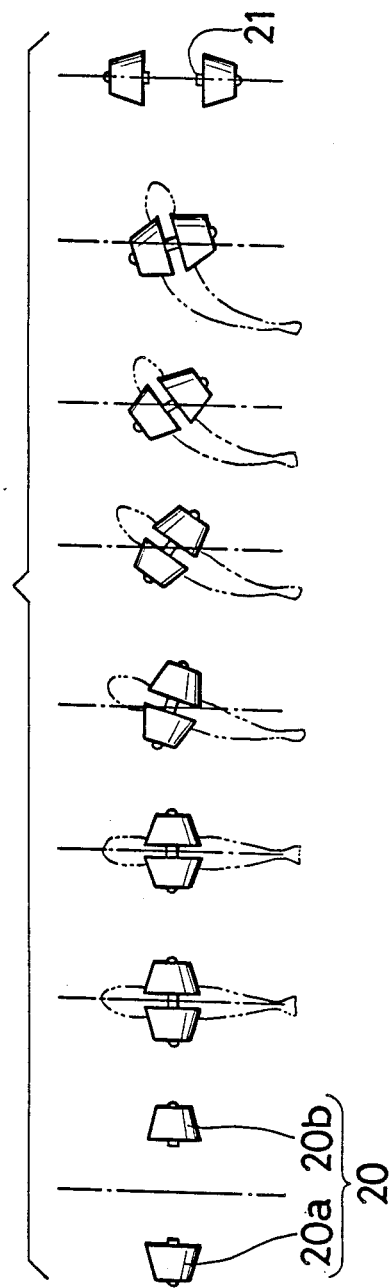
FIG. 15 is an explanatory drawing of the operation of the invention.
Figure 22:
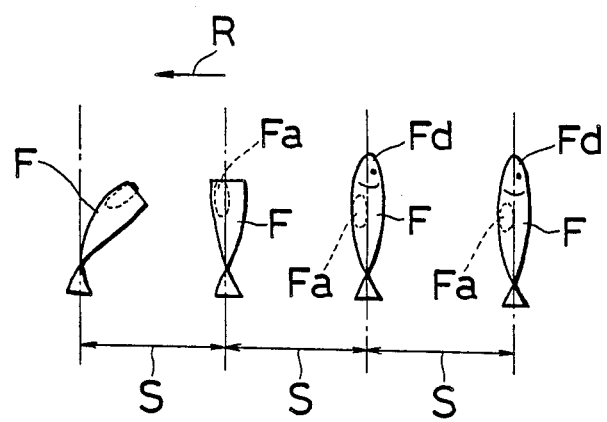
FIG. 22 is a plan view for explaining the conveying speed.

Next, the fish body F is transferred onto the first conveying means 3 which moves at a faster conveying speed than the feed conveyor 11 running, for example, at 5 m/min, that is, at say 10 m/min. When the fish body F is transferred from the feed conveyor 11 to the first conveying means 3, the conveying interval of the fish body F is extended to double that of the conveying interval in the feed conveyor 11. This conveying interval S is, as shown in FIG. 22, sufficient so as to prevent contact with the succeeding fish body F even if the decapitated fish body F is tilted as being pushed to the upstream side by the pressing member 35. At this first conveying means 3, the pair of V-belts 20a, 20b pinch the fish body F in the lying position near the head part Fa, and as shown in FIG. 15 these V-belts 20a, 20b gradually rotate, for example, clockwise toward the downstream side. In consequence, the fish body F is dislocated until the head Fa is pinched nearly in the vertical direction. Besides, as shown in FIG. 1, the fish body F is pinched of its tail Ft and is conveyed in the conveying direction A and B, also by the upper traveling route 24a of the right and left endless chains 24 of the second conveying means 4 conveying in the direction of arrow B at a conveying speed of, for example, 15 m/min.

Figure 16:
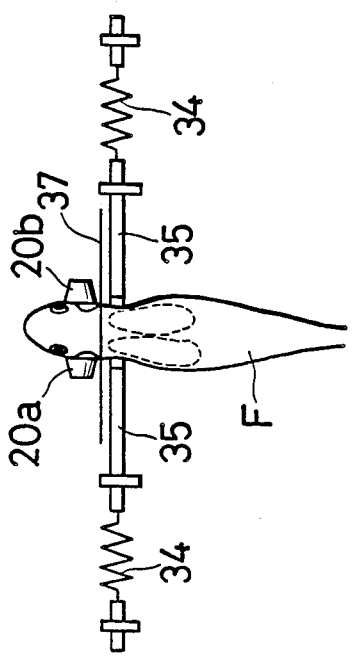
FIG. 16 is a front view of an operating state of an abdomen pressing means.

By the conveying position, the ovaries Fe of the fish body F are moved downward in the abdominal cavity together with the viscera, and further in the midst of conveying, as shown in FIG. 16, the fish body F is elastically pressed in the upper part of the abdomen by the abutting member 35 of the abdomen pressing means 5, and the ovaries Fe are pushed downward, while the vicinity of the root of the pectoral fin Fb is cut off by the rotary circular knife 37 of the chopping means 6. At this time, the conveying speed of the second conveying means 4 is selected at about, for example, 15 m/min, that is, faster than the conveying speed (10 m/min) of the first conveying means 3, and therefore when the fish body F transferred from the first conveying means 3 to the second conveying means 4, the tail Ft side is conveyed ahead of the head Fa side, so that the fish body F is tilted in a position having the tail Ft placed at the downstream side of the conveying direction B than the head part Fa. Accordingly, when cutting off the head Fa of the fish body F with the rotary circular knife 37 of the chopping means 6 in the succeeding step, the Fa1 (see FIG. 1) part at the root of the head Fa at its dorsal part is left attached to the belly side, and therefore the root part Fa1 having a relatively large portion of meat is not cut off together with the head Fa, so that the yield may be enhanced. The removed head Fa is sent up to the finish end while being held by the V-belt 20 of the first conveying means 3, and reaches the head discharge chute 23, where it is released and discharged.

The belly of the fish body F reaches the lower traveling route 24b of the endless chain 24 while being pinched by the second conveying means 4, and is conveyed with the cut section downward, and the roe collecting plate 42 abuts against it to press the abdomen, and the ovaries are pushed out from the cut section. For this pushing operation, the roe collecting plate 24 acts as follows. That is, as shown in the action explanatory drawings (1), (2), (3) in FIG. 17, the narrow portion near the tail of the fish body F passes through the confronting gap of the two backing plates 40, and the abdomen first hits the plate 42b of the roe collecting plates 42, and then abuts against the other plate 42a. Between these two plates 42a, 42a, the abdominal fins of the fish body F are held, and disturbance of the roe collecting operation by these abdominal fins is avoided.

When the fish body F further advances, the roe collecting plates 42 slightly turn in the direction of arrow D as shown in FIG. 17 (2), and push the anal portion of the abdomen while elastically pressing the abdomen of the fish body F to the backing plates 40, thereby squeezing out the ovaries Fe from the abdominal cavity. After the ovaries Fe are pushed out, as the endless chains 24 further move, the fish body F is removed from the roe collecting plates 42, and is transferred to and pinched by the third conveying means 8.

Figure 7:
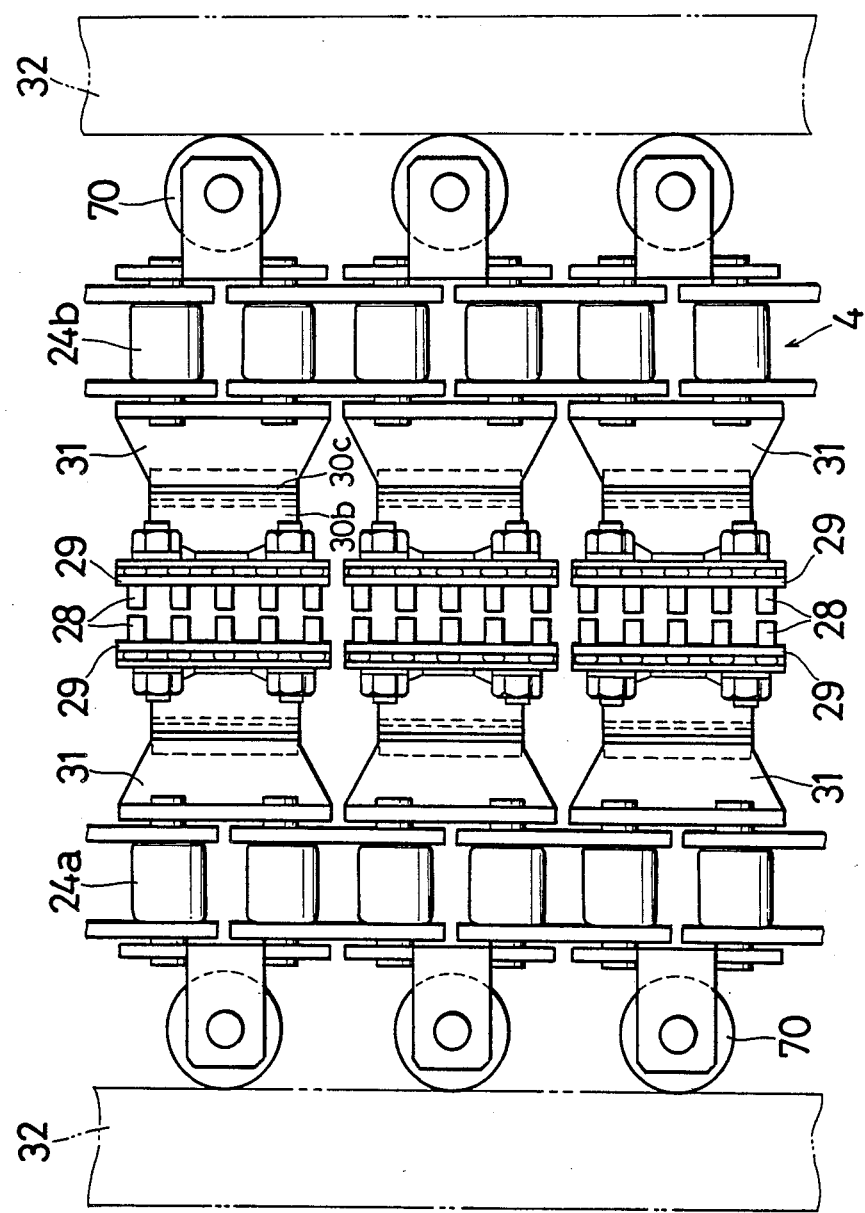
FIG. 7 is a plan view of the second conveying means.

The removed ovaries Fe are discharged downward into the roe discharge chute 44, but when the ovaries Fe are linked with the fish body F with intestine or the like, the linkage is cut off by the end corner 42c of the plate 42a (FIG. 7(3)).

Figure 18:
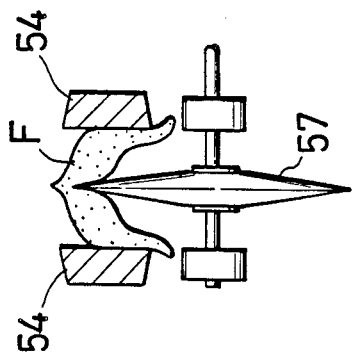
FIG. 18 is a longitudinal sectional view of a belly knife in a filleting machine.
Figure 19:
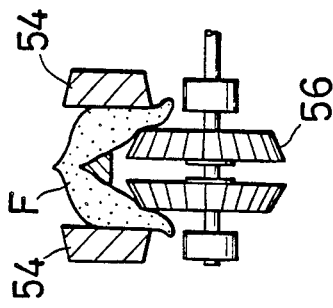
FIG. 19 is a longitudinal sectional view of a cutting roll.
Figure 20:
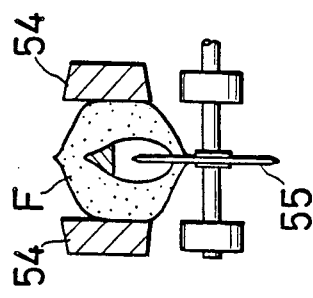
FIG. 20 is a longitudinal sectional view of a fillet knife.

The fish body F conveyed by the third conveying means 8 reaches the fish body releasing position P, and is released onto the fish body receiving chute 9, and is supplied into the filleting machine 10, with the abdomen downward, and the cut section directed to the downstream side, and is pinched by the right and left feed belts 54 to advance downstream. In this process, the fish body F is cut open in the abdomen by the belly knife 55 shown in FIG. 18, and is rid of the viscera by the action of the cutting roll 56 shown in FIG. 19, and is rid of the stem bone by the fillet knife 57 (FIG. 20), and is cut open on two sides, and discharged from plural fillet chutes 58.

According to the roe collecting apparatus 1 of the invention, the fish body F is put on the feed conveyor 11 in the lying position, with the abdomen directed to the downstream side of the conveying direction, so that the position is defined in the lengthwise direction. This positioned fish body F is conveyed a the head Fa is pinched by the first conveying means, and the tail Ft is pinched by the second conveying means. On the way of this conveying route, the head Fa is cut off and removed, and as further going on to reach the roe collecting means 7, where the eggs are collected. The fish body F after roe collection is sent into the filleting machine to be processed.

Figure 21:
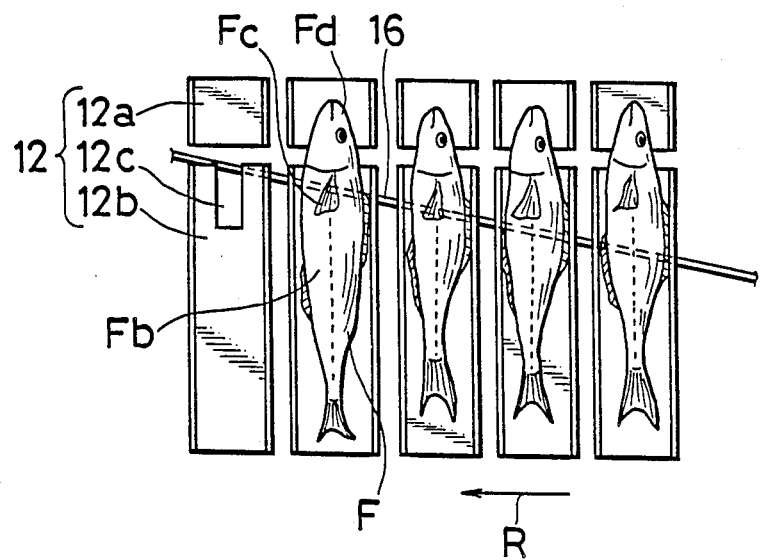
FIG. 21 is a plan view of a further embodiment of a positioning means.

FIG. 21 shows a plan view of other embodiment of the positioning means 2. In this embodiment, a piano wire 16 is stretched in the conveying route direction in the gap between the first segment 12a and second segment 12b. On this piano wire 16, the pectoral fin Fa of the fish body is hooked from its root, and the position in the lengthwise direction is determined.

In other embodiments of the invention, the stopping needles 21 may be wood screws or the like, and such needle members may be disposed on the third conveying means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus for collecting roe, comprising:
   means for holding and conveying a decapitated fish body by its tail such that the head end of the fish body faces downward; and
   collecting means for collecting roe from a decapitated fish body conveyed by said means for holding and conveying, said collecting means comprising a collecting member positioned so as to abut against the abdomen of the decapitated fish body, said collecting member being yieldably biased in a direction toward the path of said means for holding and conveying so as to be freely movable in a direction intersecting said path of said means for holding and conveying.

2. An apparatus for collecting roe according to claim 1, and further comprising:
   a first conveyor, said first conveyor comprising means for holding heads of fish bodies received in a lying position with their abdomens directed downstream with respect to the direction of movement of said first conveyor and for conveying the fish bodies while holding the heads of the fish bodies and sequentially changing the position of the fish bodies to a position wherein the heads of the fish bodies are upwardly directed;

wherein said means for holding and conveying a decapitated fish body by its tail comprises a second conveyor disposed below said first conveyor and having an upper conveying path conveying in the same direction and at least at substantially the same speed as said first conveyor and a lower conveying path below said upper conveying path conveying in a direction opposite to that of said upper conveying path, said second conveyor holding the tails of the fish bodies with the heads of the fish bodies directed upwardly along said upper conveying path and with the tails of the fish bodies directed upwardly along said lower conveying path;

means for pressing the abdomen of the fish bodies, said means for pressing disposed along said upper conveying path adjacent said first conveyor and said second conveyor, and said means comprising an abutting member having a front end positioned so as to contact the fish bodies at the head end of the abdomen, said abutting member being yieldably biased in a direction opposite the conveying direction of said first conveyor, whereby when said means for pressing presses on an abdomen of a fish body, the ovaries of the fish body are shifted toward the caudal side of the abdominal cavity of the fish body; and cutting means disposed along said upper conveying path adjacent said first conveyor and said second conveyor for cutting off the heads of the fish bodies adjacent the root of the pectoral fin on the fish bodies;

wherein said collecting means is disposed beneath said second conveyor, and in abutting against the abdomen of a decapitated fish body pushes against the caudal side of the abdomen with said collecting member to push out the ovaries of the fish body.

3. An apparatus for collecting roe as set forth in claim 2, wherein said means for holding and conveying of said first conveyor comprises:
   a pair of upper and lower start end pulleys having pulley axes extending in a substantially horizontal direction;
   a pair of right and left finish end pulleys having pulley axes extending substantially parallel to each other in a substantially vertical direction; and
   a pair of belts wound on said upper and lower start end and right and left finish end pulleys; said belts being biased toward each other.

4. An apparatus for collecting roe as set forth in claim 2, wherein said second conveyor comprises:
   two pairs of sprocket wheels;
   a pair of endless chains wound on said pairs of sprocket wheels;
   a plurality of fish tail holding members disposed at predetermined intervals along the longitudinal extent of said endless chains, said holding members having mutually facing projections thereon for contacting the fish tails of the fish bodies;
   mounting members for elastically mounting said holding members to said endless chains;
   a guide member for guiding said endless chains such that said mutually facing holding members approach each other in the direction of movement of said second conveyor; and
   a positioning means for vertically positioning and guiding said holding members on said endless chains, said positioning means abutting said mounting members.

5. An apparatus for collecting roe as set forth in claim 2, wherein said collecting means further comprises:
   a pair of backing members disposed beneath said second conveyor, separated by an interval smaller than the width of a fish body conveyed by said second conveyor;
   wherein said collecting member is L-shaped, is disposed beneath said backing members perpendicular to the direction of conveyance of said second conveyor, and faces upstream with respect to the direction of conveyance of said second conveyor; and
   a support shaft biased upwardly toward said second conveyor, said L-shaped collecting member being supported by said upwardly biased support shaft.

6. A fish body processing machine having an apparatus for collecting roe, said apparatus comprising:
   a first conveying means for holding the heads of fish bodies received in a lying position with their abdomens directed downstream with respect to the direction of movement of said first conveying means and for conveying the fish bodies while holding the heads of the fish bodies and sequentially changing the position of the fish bodies to a position wherein the heads of the fish bodies are upwardly directed;
   a second conveying means for holding and conveying a decapitated fish body by its tail disposed below said first conveyor and having an upper conveying path conveying in the same direction and at least at substantially the same speed as said first conveying means and a lower conveying path below said upper conveying path conveying in a direction opposite to that of said upper conveying path, said second conveyor means holding the tails of the fish bodies with the heads of the fish bodies directed upwardly along said upper conveying path and with the tails of the fish bodies directed upwardly along said lower conveying path;
   means for pressing the abdomens of the fish bodies, said means for pressing disposed along said upper conveying path adjacent said first conveyor means and said second conveyor means, and said means comprising an abutting member having a front end positioned so as to be contactable with the fish bodies at the head of the abdomens, said abutting member being yieldably biased in a direction opposite the conveying direction of said first conveying means, whereby when said means for pressing presses on an abdomen of a fish body, the ovaries of the fish body are shifted toward the caudal side of the abdominal cavity of the fish body;
   cutting means disposed along said upper conveying path adjacent said fixed conveying means and said second conveying means for cutting off the heads of the fish bodies adjacent the root of the pectoral fin of said fish bodies;
   collecting means disposed beneath said second conveying means for collecting roe, said collecting means comprising a collecting member for pushing against the caudal side of the abdomens of the fish bodies to push out the ovaries of the fish bodies; and
   fish body processing means for receiving the fish bodies after the ovaries have been removed and processing the fish bodies.

* * * * *